US012404828B2

(12) United States Patent
Kusaka et al.

(10) Patent No.: US 12,404,828 B2
(45) Date of Patent: Sep. 2, 2025

(54) VEHICLE DRIVING DEVICE

(71) Applicant: SUBARU CORPORATION, Tokyo (JP)

(72) Inventors: Yu Kusaka, Tokyo (JP); Man Cao, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/765,492

(22) Filed: Jul. 8, 2024

(65) Prior Publication Data

US 2024/0360810 A1    Oct. 31, 2024

Related U.S. Application Data

(63) Continuation of application No. PCT/JP2023/012021, filed on Mar. 24, 2023.

(51) Int. Cl.
*F01M 5/00* (2006.01)
*F01M 1/02* (2006.01)
(Continued)

(52) U.S. Cl.
CPC ............... *F02N 11/08* (2013.01); *F01M 1/02* (2013.01); *F01M 5/001* (2013.01); *B60K 6/24* (2013.01);
(Continued)

(58) Field of Classification Search
CPC .......... F01M 5/001; F01M 1/02; F01M 5/005; F01M 5/021; F01M 2001/0215;
(Continued)

(56) References Cited

U.S. PATENT DOCUMENTS 8,739,757 B2    6/2014    Futonagane et al.
11,536,169 B2   12/2022   Higashi
(Continued)

FOREIGN PATENT DOCUMENTS

JP    5293834 B2    9/2013
JP    6372459 A     8/2018
(Continued)

OTHER PUBLICATIONS

International Search Report dated Jun. 6, 2023, from International Application No. PCT/JP2023/012021, 8 pages.

*Primary Examiner* — Lindsay M Low
*Assistant Examiner* — Teuta B Holbrook
(74) *Attorney, Agent, or Firm* — Rimon P.C.

(57) ABSTRACT

A vehicle driving device includes an engine, an electric pump, an electric heater, a starter motor, and a control system. The control system calculates a first actual viscosity of an engine oil based on a load torque of an electric pump. The control system causes an electric heater to operate by supplying a first energy to the electric heater and calculates a second actual viscosity of the engine oil based on the load torque of the electric pump. The control system calculates, based on the second actual viscosity of the engine oil and a target viscosity of the engine oil, a second energy that is to be supplied to the electric heater. The control system causes the electric heater to operate by supplying the second energy to the electric heater and then drives a starter motor so as to cause an output shaft to perform starting rotation.

10 Claims, 13 Drawing Sheets

(51) Int. Cl.
*F02N 11/08* (2006.01)
*B60K 6/24* (2007.10)

(52) U.S. Cl.
CPC ....... *B60Y 2200/92* (2013.01); *B60Y 2306/03* (2013.01); *B60Y 2400/43* (2013.01); *F01M 2001/0215* (2013.01); *F01M 2005/008* (2013.01)

(58) Field of Classification Search
CPC .... F01M 5/02; F01M 5/00; F01M 2011/1473; F02N 11/00; F02D 2200/023; F02D 41/062
See application file for complete search history.

(56) References Cited

U.S. PATENT DOCUMENTS

2015/0075481 A1* 3/2015 Cattani ................ F01N 5/02
 123/196 AB
2015/0105996 A1* 4/2015 Leone .................. F01M 11/10
 701/103

FOREIGN PATENT DOCUMENTS

| | | |
|---|---|---|
| JP | 2020-75678 A | 5/2020 |
| JP | 2022-57210 A | 4/2022 |

\* cited by examiner

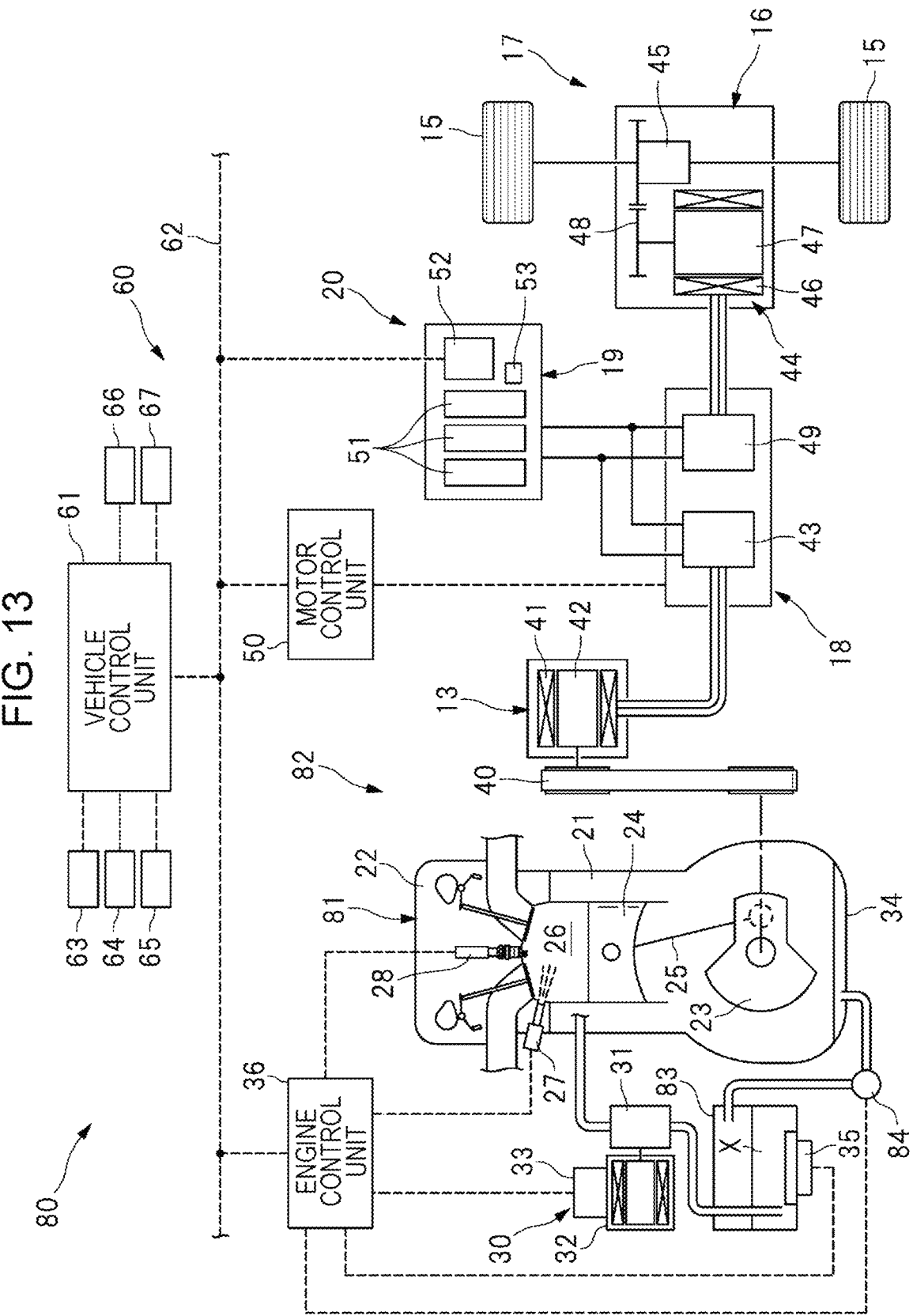

VEHICLE DRIVING DEVICE

CROSS-REFERENCE TO RELATED APPLICATIONS

This application is continuation of International Application No. PCT/JP2023/012021, filed on Mar. 24, 2023, the entire contents of which are hereby incorporated by reference.

BACKGROUND

The present disclosure relates to a vehicle driving device.

As a lubricating oil, an engine oil is injected into an engine mounted on a vehicle (see PTLs 1 to 4). In addition, there has been proposed a vehicle that includes a heater provided at an oil pan or the like from the standpoint of heating the engine oil in a low-temperature environment (see PTLs 1 to 3).

PATENT LITERATURE

PTL 1: Japanese Patent No. 6372459
PTL 2: Japanese Unexamined Patent Application Publication No. 2020-75678
PTL 3: Japanese Patent No. 5293834
PTL 4: Japanese Unexamined Patent Application Publication No. 2022-57210

SUMMARY

By causing the heater, which is provided at the oil pan or the like, to operate, the engine oil can be heated so as to reduce the oil viscosity, and the startability of the engine can be improved. However, the type and deterioration state of an engine oil injected into an engine vary for each vehicle, and thus, it is also common that a viscosity change characteristic of an engine oil vary for each vehicle. In other words, it is difficult to appropriately reduce an oil viscosity by simply operating a heater based on an oil temperature, and it is difficult to improve startability of an engine.

An aspect of the present disclosure provides a vehicle driving device including an engine. The vehicle driving device includes an electric pump, an electric heater, a starter motor, and a control system. The electric pump is provided in the engine and configured to pump an engine oil. The electric heater is provided in the engine and configured to heat the engine oil. The starter motor is provided in the engine and configured to cause an output shaft to perform starting rotation. The control system includes a processor and a memory communicably coupled to each other, and is configured to control the electric pump, the electric heater, and the starter motor. The control system is configured to execute: a first step of driving the electric pump before startup of the engine and calculating a first actual viscosity of the engine oil based on a load torque of the electric pump; a second step of causing the electric heater to operate by supplying a first energy to the electric heater, drives the electric pump after the electric heater has been caused to operate and before the startup of the engine, and calculating a second actual viscosity of the engine oil based on the load torque of the electric pump; a third step of calculating, based on the second actual viscosity of the engine oil and a target viscosity of the engine oil, a second energy that is to be supplied to the electric heater; and a fourth step of causing the electric heater to operate by supplying the second energy to the electric heater and then drives the starter motor to cause the output shaft to perform starting rotation.

According to the present disclosure, an effect of improving startability of an engine can be achieved.

BRIEF DESCRIPTION OF DRAWINGS

FIG. 13 is a diagram illustrating a vehicle driving device of another embodiment.

DESCRIPTION OF EMBODIMENTS

Embodiments of the present invention will be described in detail below with reference to the drawings. Note that, in the following description, the same or substantially the same configurations and elements will be denoted by the same reference signs, and repeated descriptions thereof will be omitted.

First Embodiment

Figure 1:
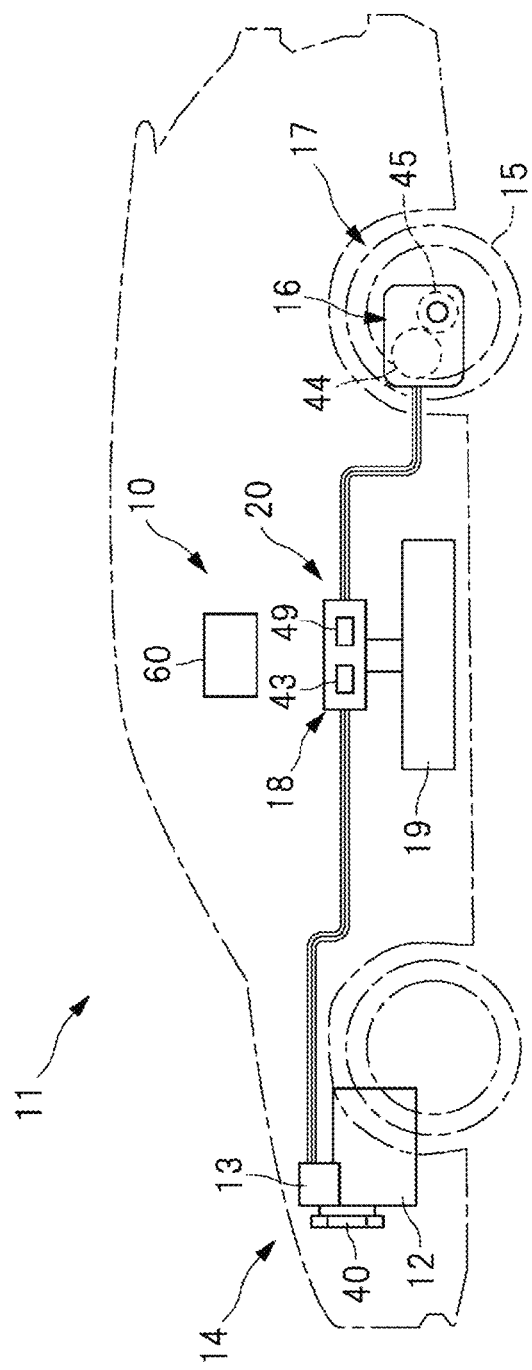
FIG. 1 is a diagram illustrating an example of a vehicle that includes a vehicle driving device of an embodiment.

<Vehicle Configuration>
FIG. 1 is a diagram illustrating an example of a vehicle 11 that includes a vehicle driving device 10 of the first embodiment. As illustrated in FIG. 1, the vehicle driving device 10 includes a power generation unit 14 and a driving unit 17. The power generation unit 14 includes an engine 12 and a starter generator 13. The driving unit 17 includes an electric axle 16 that is coupled to wheels 15. The power generation unit 14 and the driving unit 17 are coupled to each other via a power supply unit 20. The power supply unit 20 includes an inverter 18 and a battery pack 19. Note that, although the vehicle 11 illustrated in FIG. 1 is a so-called series hybrid vehicle, it is not limited to this and may be a series-parallel hybrid vehicle.

Figure 2:
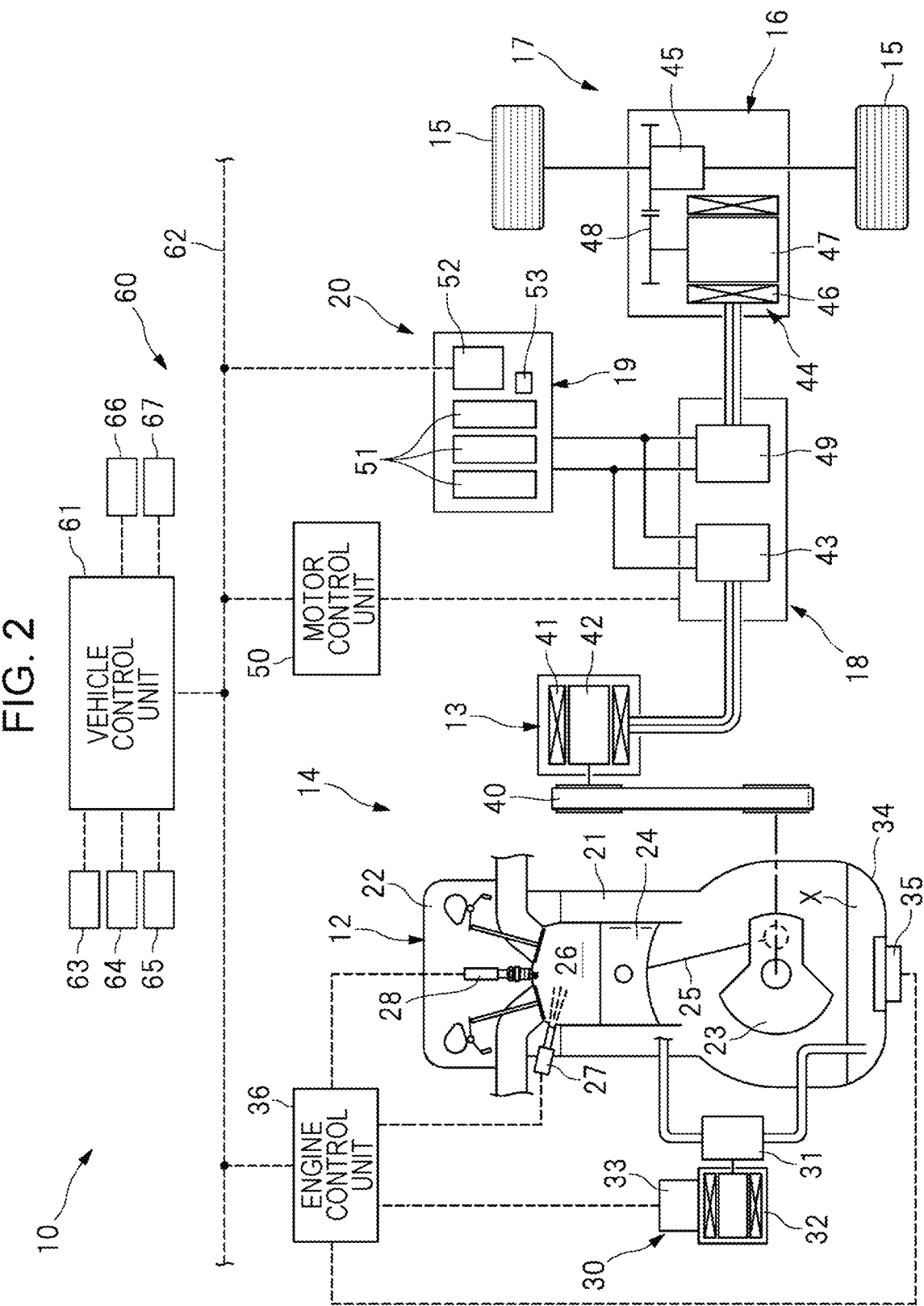
FIG. 2 is a diagram illustrating an example of the vehicle driving device.

FIG. 2 is a diagram illustrating an example of the vehicle driving device 10. As illustrated in FIG. 2, the engine 12 includes a cylinder block 21 and a cylinder head 22 that is attached to the cylinder block 21. The engine 12 further includes a crankshaft (output shaft) 23 and a piston 24. The crankshaft 23 is rotatably supported by the cylinder block 21. The piston 24 is accommodated in the cylinder block 21 so as to be capable of reciprocating. The crankshaft 23 and the piston 24 are coupled to each other by a connecting rod 25. In addition, the cylinder head 22 includes an injector 27 and an ignition device 28. The injector 27 injects fuel into a combustion chamber 26. The ignition device 28 is formed of a spark plug or the like and ignites an air-fuel mixture in the combustion chamber 26.

The engine 12 includes an electric oil pump (electric pump) 30 that pumps an engine oil. The electric oil pump 30 includes a pump member 31, a motor member 32, and a driving circuit unit 33. The pump member 31 is formed of a gear pump. The motor member 32 drives the pump member 31 so that the pump member 31 rotates. The driving circuit unit 33 controls an energization state of the motor member 32. By driving the electric oil pump 30, an engine oil X in an oil pan 34 is supplied to each sliding member including a bearing through an oil passage of the cylinder block 21. The engine oil supplied to each of the sliding members in the engine 12 lubricates each of the sliding members and then is returned to the oil pan 34 that is located below the cylinder block. The oil pan 34 of the engine 12 is provided with an electric heater 35 that generates heat by being energized. In addition, an engine control unit 36 that is an electronic control unit is coupled to the electric oil pump 30, the electric heater 35, the injector 27, and the ignition device 28.

A starter generator (starter motor) 13 is coupled to the crankshaft 23 of the engine 12 via a belt mechanism 40. The starter generator 13 includes a stator 41 and a rotor 42. A stator coil is wound around the stator 41. The rotor 42 is rotatably accommodated in the stator 41. The starter generator 13 is a so-called integrated starter generator (ISG) that serves as a power generator and an electric motor. In other words, the starter generator 13 serves as a power generator that generates electric power by using engine power and also serves as an electric motor that causes the crankshaft 23 to perform starting rotation at the time of engine startup. A switching circuit unit 43 that includes switching elements and the like is coupled to the stator 41 of the starter generator 13. In addition, the battery pack 19 that is formed of a battery cell, such as a lithium ion battery, is coupled to the switching circuit unit 43 of the inverter 18.

The electric axle 16 includes a driving motor 44 and a differential mechanism 45. The driving motor 44 includes a stator 46 and a rotor 47. A stator coil is wound around the stator 46. The rotor 47 is rotatably accommodated in the stator 46. The rotor 47 of the driving motor 44 is coupled to the wheels 15 via a gear train 48 and the differential mechanism 45. By controlling the driving motor 44 to be in a power running state, the wheels 15 can be driven by the driving motor 44. On the other hand, by controlling the driving motor 44 to be in a regenerative state, the driving motor 44 is caused to generate electric power, so that the wheels 15 can be braked. A switching circuit unit 49 that includes switching elements and the like is coupled to the stator 46 of the driving motor 44. The battery pack 19 is coupled to the switching circuit unit 49 of the inverter 18. In addition, a motor control unit 50 that is an electronic control unit is coupled to the inverter 18.

The battery pack 19 includes battery modules 51 and a battery control unit 52. The battery modules 51 include battery cells. The battery control unit 52 monitors charging and discharging of the battery modules 51. The battery pack 19 further includes a battery sensor 53 that detects a charge/discharge current, a terminal voltage, and so forth. The battery control unit 52 that is an electronic control unit calculates, based on the charge/discharge current, the terminal voltage, and so forth, a state of charge (SOC) of the battery pack 19. Note that the SOC of the battery pack 19 is a ratio indicating the remaining amount of electricity stored in the battery pack 19 and is a ratio of the amount of electricity stored in the battery pack 19 to the full-charged capacity of the battery pack 19.

<Control System>

As illustrated in FIG. 2, the vehicle driving device 10 includes a control system 60 including multiple electronic control units. The electronic control units of the control system 60 include the engine control unit 36, the motor control unit 50, and the battery control unit 52, which have been mentioned above. The electronic control units of the control system 60 also include a vehicle control unit 61 that outputs a control signal to each of the above-mentioned control units 36, 50, and 52. These control units 36, 50, 52, and 61 are coupled to one another via an in-vehicle network 62, such as a controller area network (CAN), so as to be capable of communicating with one another.

The vehicle control unit 61 sets operational targets for the power generation unit 14, the driving unit 17, and the like based on information received from the various control units and various sensors, which will be described below. The vehicle control unit 61 generates control signals that correspond to the operational targets for the power generation unit 14, the driving unit 17, and the like and outputs these control signals to the engine control unit 36, the motor control unit 50, and the like. Sensors that are coupled to the vehicle control unit 61 include an accelerator sensor 63 and a brake sensor 64. The accelerator sensor 63 detects an operating amount of an accelerator pedal. The brake sensor 64 detects an operating amount of a brake pedal. The sensors coupled to the vehicle control unit 61 also include a vehicle speed sensor 65 and a temperature sensor 66. The vehicle speed sensor 65 detects a vehicle speed that is the traveling speed of the vehicle 11. The temperature sensor 66 detects an outside air temperature. In addition, a start switch 67 is coupled to the vehicle control unit 61. When the control system 60 is activated, the start switch 67 is operated by a driver who drives the vehicle 11.

Figure 3:
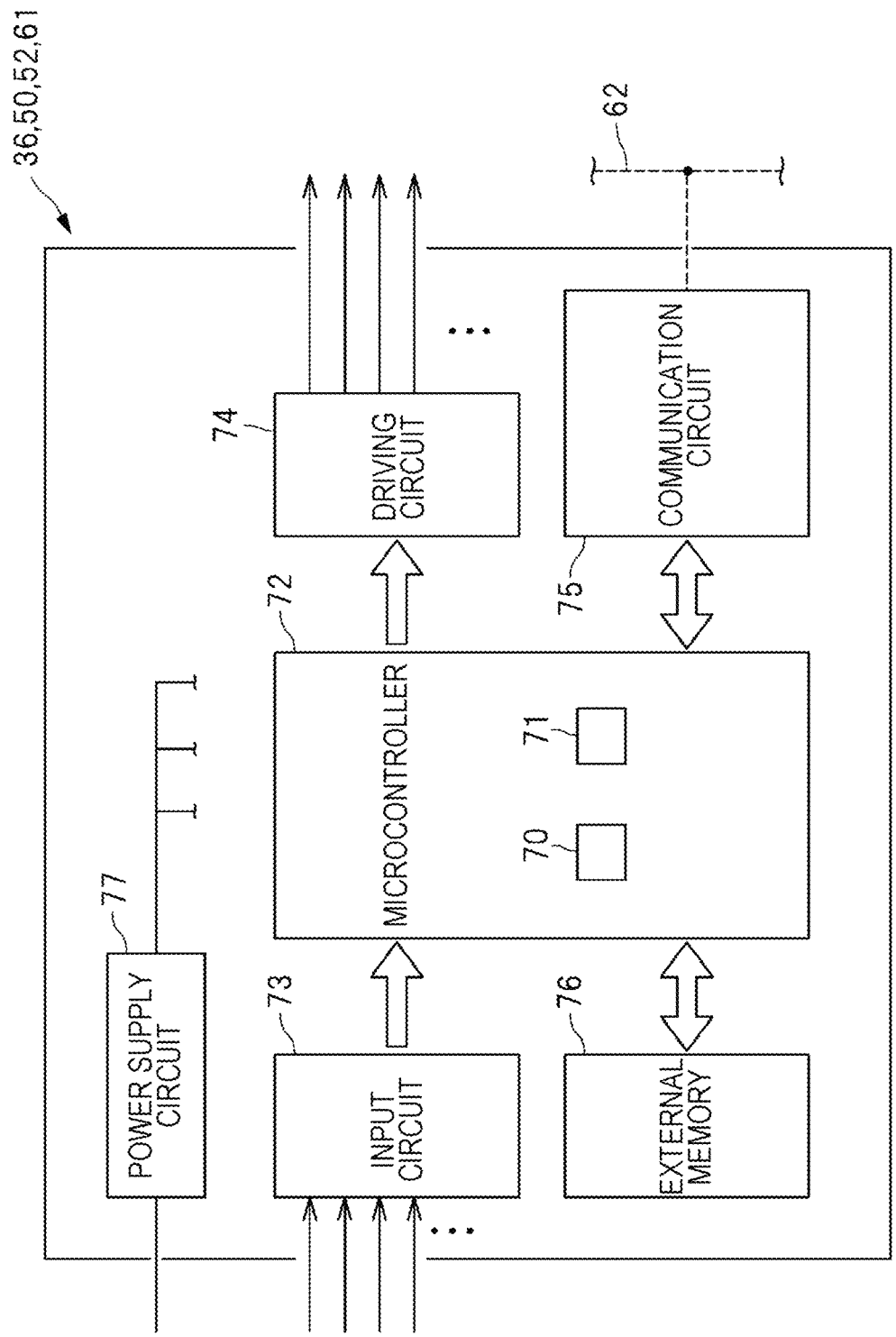
FIG. 3 is a diagram illustrating an example of a basic structure of a control unit.

FIG. 3 is a diagram illustrating an example of a basic structure of each of the control units 36, 50, 52, and 61. As illustrated in FIG. 3, the control units 36, 50, 52, and 61, which are electronic control units, each include a microcontroller 72 in which a processor 70, a main memory (memory) 71, and the like are incorporated. A predetermined program is stored in the main memory 71, and the program is executed by the processor 70. The processor 70 and the main memory 71 are coupled to each other so as to be capable of communicating with each other. Note that multiple processors 70 may be incorporated in the microcontroller 72, and multiple main memories 71 may be incorporated in the microcontroller 72.

Each of the control units 36, 50, 52, and 61 further includes an input circuit 73, a driving circuit 74, a communication circuit 75, an external memory 76, and a power supply circuit 77. The input circuit 73 converts signals received from the various sensors into signals that can be input to the microcontroller 72. The driving circuit 74 generates, based on a signal output by the microcontroller 72, driving signals for various devices including the inverter 18, the electric oil pump 30, and the electric heater 35, which have been mentioned above. The communication circuit 75 converts signals output by the microcontroller 72 into communication signals directed to the other control units. In addition, the communication circuit 75 converts communication signals received from the other control units into signals that can be input to the microcontroller 72. The power supply circuit 77 supplies a stable power supply voltage to the microcontroller 72, the input circuit 73, the driving circuit 74, the communication circuit 75, the external memory 76, and so forth. The external memory 76 that is formed of a non-volatile memory or the like stores a program, various data, and the like.

<Control Modes of Power Generation Unit>

The vehicle driving device 10 has a combustion power generation mode and a power generation stop mode as control modes of the power generation unit 14. In the combustion power generation mode, the starter generator 13 is caused to generate electric power. In the power generation stop mode, the starter generator 13 is caused to stop generating electric power. The combustion power generation mode is a control mode in which the engine 12 is controlled to be in an operating state and in which the starter generator 13 is controlled to be in a power generating state. The power generation stop mode is a control mode in which the engine 12 and the starter generator 13 are controlled to be in a non-operating state.

Figure 4:
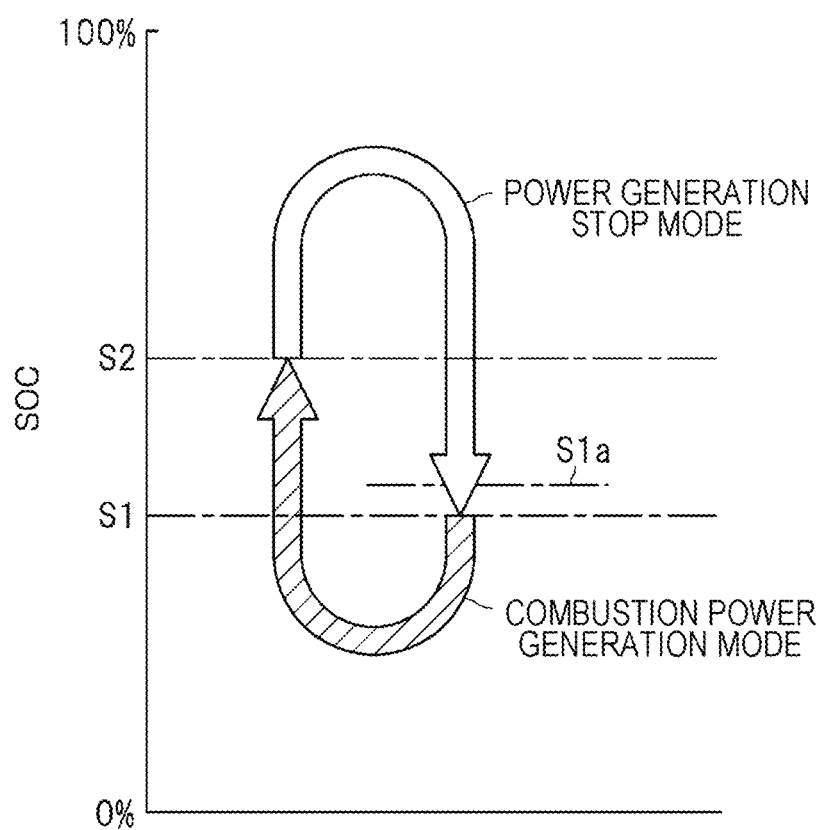
FIG. 4 is a diagram illustrating an example of execution states of a combustion power generation mode and a power generation stop mode.

FIG. 4 is a diagram illustrating an example of execution states of the combustion power generation mode and the power generation stop mode. As illustrated in FIG. 4, in a state where the power generation stop mode is executed, the control system 60 switches the control mode from the power generation stop mode to the combustion power generation mode when the SOC of the battery pack 19 falls below a threshold S1. In other words, when the SOC falls below the threshold S1 during engine stop, the control system 60 determines that an engine startup condition for starting the engine 12 is satisfied. Then, the control system 60 drives the starter generator 13 so as to start the engine 12. After that, the control system 60 controls the starter generator 13 to be in the power generating state and switches the control mode to the combustion power generation mode. As a result, the battery pack 19 can be charged by causing the starter generator 13 to generate electric power, so that the SOC of the battery pack 19 can be gradually increased.

In addition, in a state where the combustion power generation mode is executed, the control system 60 switches the control mode from the combustion power generation mode to the power generation stop mode when the SOC of the battery pack 19 exceeds a threshold S2 that is greater than the threshold S1. In other words, when the SOC exceeds the threshold S2 during engine operation, the control system 60 determines that an engine stop condition for stopping the engine 12 is satisfied. Then, the control system 60 stops the engine 12 and switches the control mode to the power generation stop mode. As a result, the driving motor 44 can be driven by using the electric power stored in the battery pack 19, and this can cause the vehicle 11 to travel in a state where the engine 12 is stopped. Note that, even in the power generation stop mode, the driving motor 44 is controlled to be in the regenerative state during deceleration of the vehicle, and thus, the battery pack 19 is charged by the driving motor 44.

<Oil Heating Control: Flowchart>

As described above, when the SOC of the battery pack 19 falls below the threshold S1, the control system 60 starts the engine 12 and controls the starter generator 13 to be in the power generating state. Here, in a low-temperature environment such as a cold region (e.g., −20° C.), the viscosity of the engine oil (hereafter referred to as "oil viscosity") is high, and the rotational resistance of the crankshaft 23 is high. Thus, it is difficult to cause the crankshaft 23 to perform starting rotation by the starter generator 13. Accordingly, the control system 60 executes oil heating control. In the oil heating control, the electric heater 35 is caused to operate and heat the engine oil before engine startup so as to reduce the oil viscosity and so as to improve the startability of the engine 12.

Figure 5:
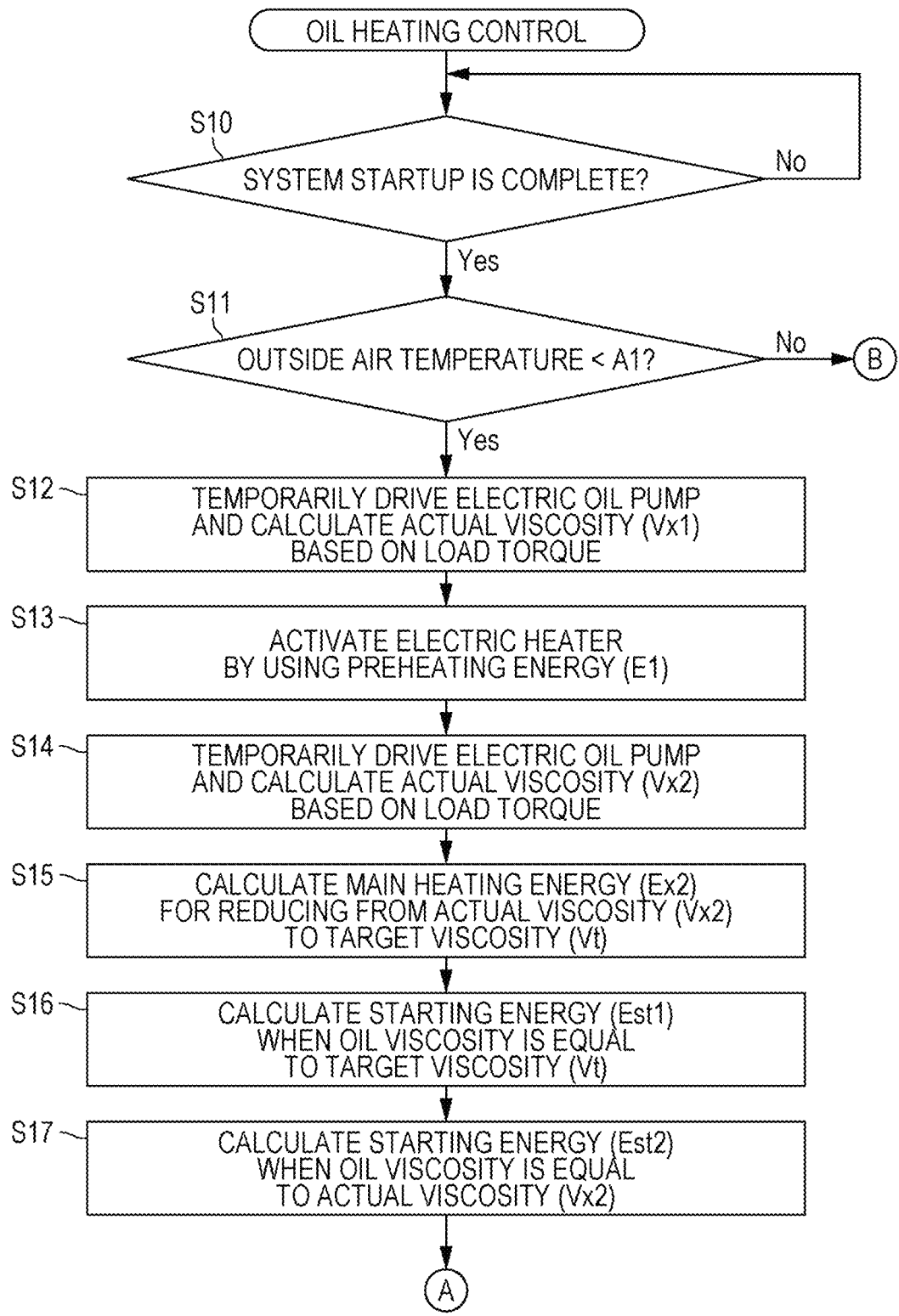
FIG. 5 is a flowchart illustrating an example of an execution process of oil heating control.
Figure 6:
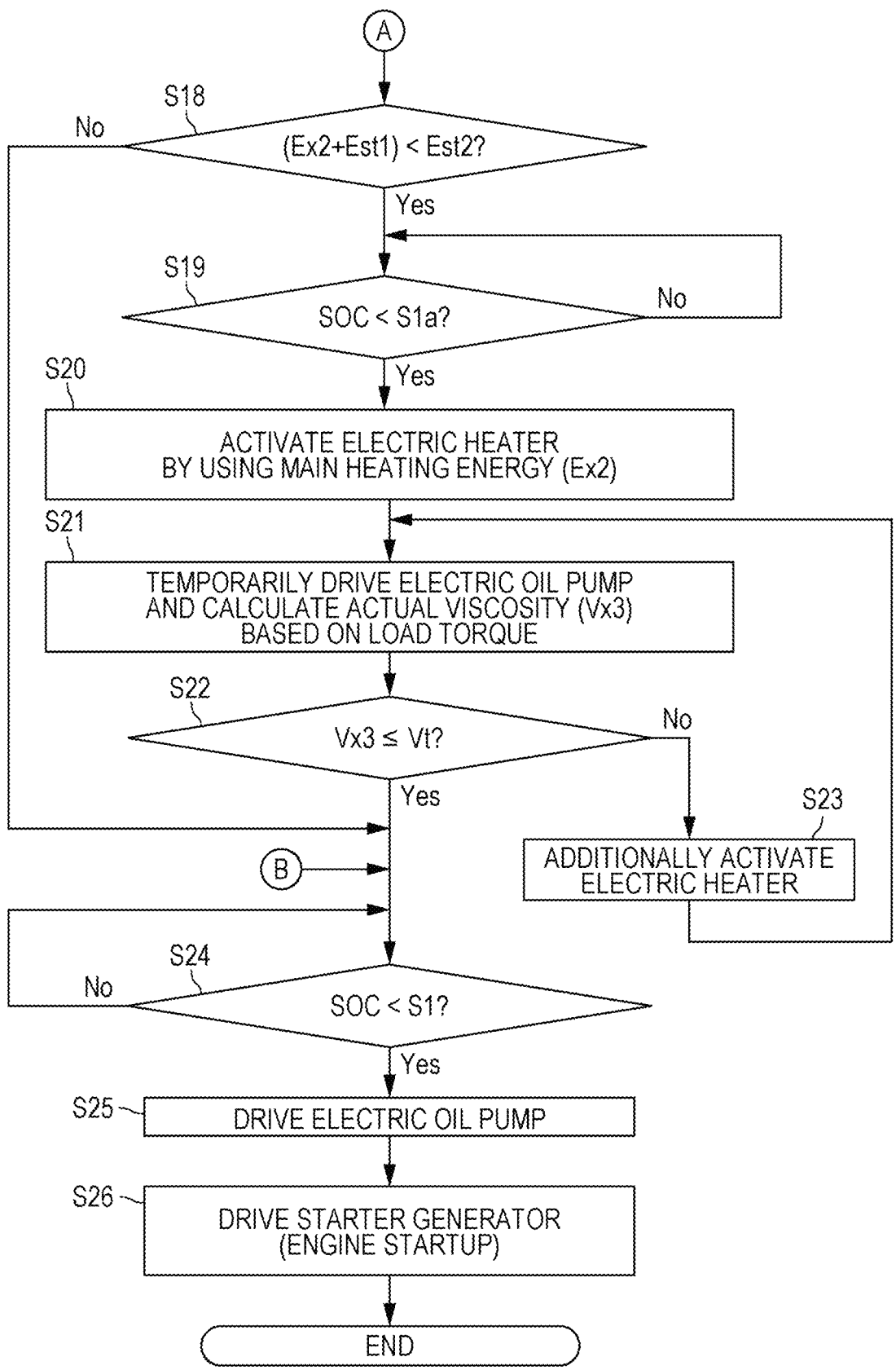
FIG. 6 is a flowchart illustrating the example of the execution process of the oil heating control.

An execution process of the oil heating control will be described below. FIG. 5 and FIG. 6 are flowcharts illustrating an example of the execution process of the oil heating control. The flowcharts illustrated in FIG. 5 and FIG. 6 are coupled to each other at a point denoted by the reference sign A and are also coupled to each other at a point denoted by the reference sign B. In addition, each step of the oil heating control illustrated in FIG. 5 and FIG. 6 is a step that is executed by at least one of the processors 70 included in the control system 60.

As illustrated in FIG. 5, the control system 60 proceeds to step S10 and determines whether startup of the control system 60 is complete. If the control system 60 determines in step S10 that system startup is complete, the control system 60 proceeds to step S11 and determines whether the outside air temperature is lower than a predetermined threshold A1 (e.g., 0° C.). If the control system 60 determines in step S11 that the outside air temperature is lower than the threshold A1, the control system 60 proceeds to step S12 and temporarily drives the electric oil pump 30 before engine startup. Then, in step S12, the control system 60 calculates, based on a load torque of the electric oil pump 30, an actual viscosity (first actual viscosity) Vx1 that is the actual oil viscosity.

Figure 7:
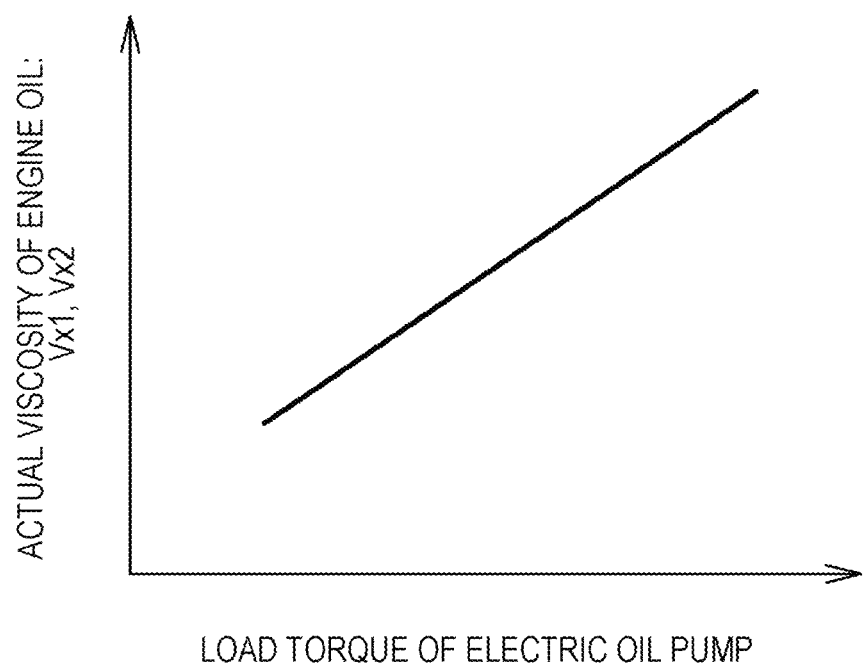
FIG. 7 is a graph illustrating an example of a relationship between a load torque of an electric oil pump and an actual viscosity of an engine oil.

FIG. 7 is a graph illustrating an example of a relationship between the load torque of the electric oil pump 30 and the actual viscosity of the engine oil. As illustrated in FIG. 7, the actual viscosity Vx1 of the engine oil increases as the load torque of the electric oil pump 30 increases. In other words, in step S12, which has been described above, the control system 60 calculates the actual viscosity Vx1 of the engine oil such that the actual viscosity Vx1 increases as the load torque of the electric oil pump 30 increases. Note that the control system 60 can calculate the load torque of the electric oil pump 30 based on the current consumption of the electric oil pump 30. In other words, the control system 60 calculates the load torque of the electric oil pump 30 such that the load torque increases as the current consumption of the electric oil pump 30, which is driven at a constant rotational speed, increases.

As illustrated in FIG. 5, after the control system 60 has calculated the actual viscosity Vx1 in step S12, the control system 60 proceeds to step S13 and supplies a predetermined preheating energy (first energy) E1 (kWh) to the electric heater 35 so as to cause the electric heater 35 to operate. After the control system 60 has caused the electric heater 35 to operate in step S13, the control system 60 proceeds to step S14 and temporarily drives the electric oil pump 30 again before the engine startup. Then, in step S14, the control system 60 calculates, based on the load torque of the electric oil pump 30, an actual viscosity (second actual viscosity) Vx2 that is the actual oil viscosity. Note that, as illustrated in FIG. 7, also in step S14, the control system 60 calculates the actual viscosity Vx2 of the engine oil such that the actual viscosity Vx2 increases as the load torque of the electric oil pump 30 increases.

After the control system 60 has calculated the actual viscosity Vx2 in step S14, the control system 60 proceeds to step S15 and calculates a main heating energy (second energy) Ex2 (kWh) that is to be supplied to the electric heater 35. Here, the main heating energy Ex2 is energy that is used for reducing the oil viscosity from the actual viscosity Vx2 to a target viscosity Vt and is the amount of power, or energy, used by the electric heater 35. Note that the target viscosity Vt of the engine oil is an upper limit of the oil viscosity at the time of engine startup from the standpoint of appropriately starting the engine 12 by using the starter generator 13. In other words, by reducing the oil viscosity to the target viscosity Vt, the crankshaft 23 can be caused to appropriately perform starting rotation by the starter generator 13, and the engine 12 can be appropriately started.

Figure 8:
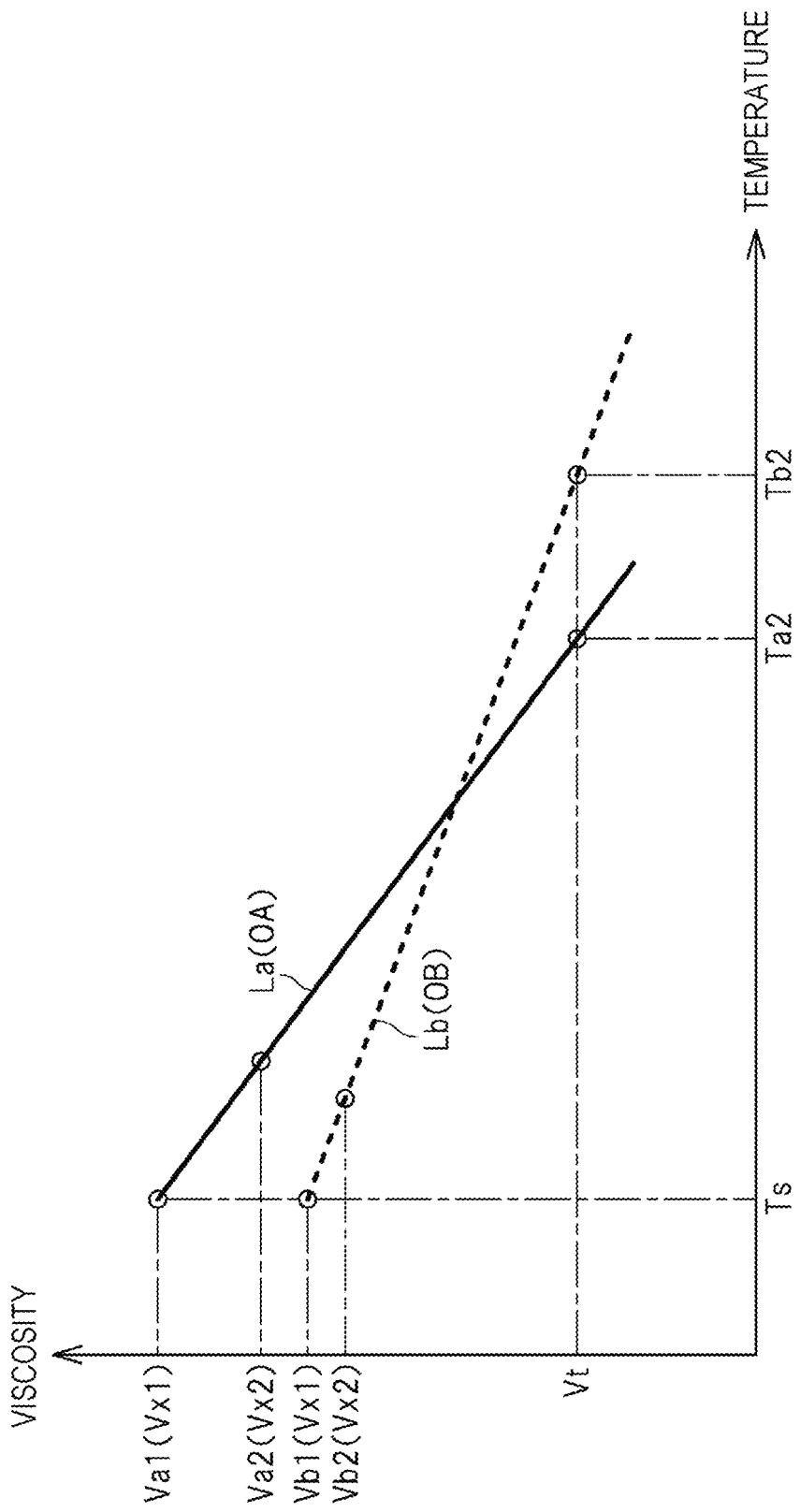
FIG. 8 is a graph illustrating an example of a relationship between a temperature of the engine oil and a viscosity of the engine oil.
Figure 9:
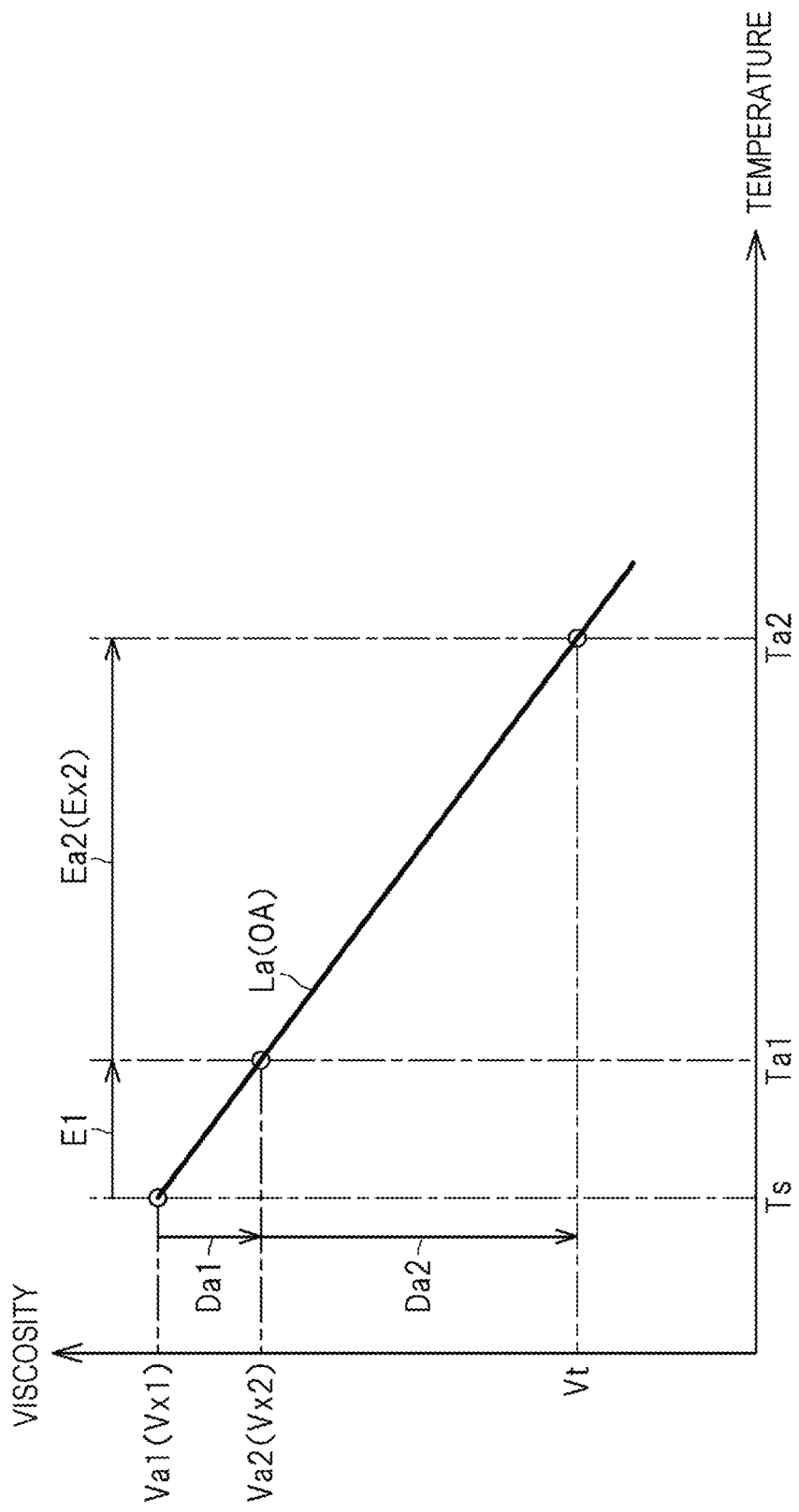
FIG. 9 is a graph illustrating the example of the relationship between the temperature of the engine oil and the viscosity of the engine oil.
Figure 10:
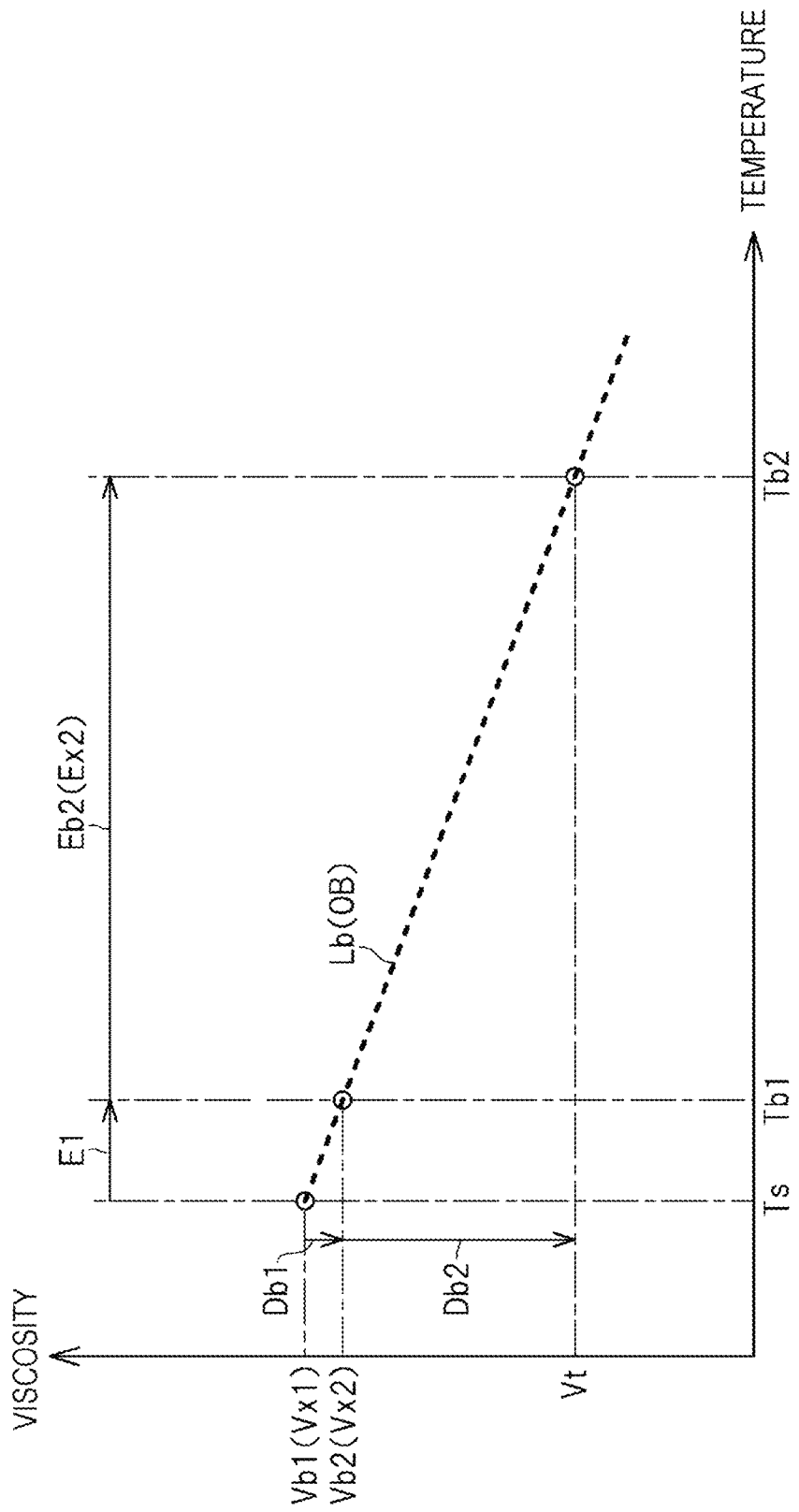
FIG. 10 is a graph illustrating the example of the relationship between the temperature of the engine oil and the viscosity of the engine oil.

FIG. 8, FIG. 9, and FIG. 10 are graphs illustrating an example of the relationship between the temperature of the engine oil and the viscosity of the engine oil. In FIG. 8 and FIG. 9, a viscosity change characteristic of an engine oil OA is indicated by a solid line. In FIG. 8 and FIG. 10, a viscosity change characteristic of an engine oil OB that is different from the engine oil OA is indicated by a dashed line. In addition, in FIG. 8 and FIG. 9, an actual viscosity Va1 is the actual viscosity Vx1 of the engine oil OA calculated in step S12, and an actual viscosity Va2 is the actual viscosity Vx2 of the engine oil OA calculated in step S14. In FIG. 8 and FIG. 10, an actual viscosity Vb1 is the actual viscosity Vx1 of the engine oil OB calculated in step S12, and the actual viscosity Vb2 is the actual viscosity Vx2 of the engine oil OB calculated in step S14.

As illustrated in FIG. 8, when the actual viscosity of the engine oil OA that has not yet been heated is "Va1" and the actual viscosity of the engine oil OA that has been heated is "Va2", the viscosity change characteristic of the engine oil OA is calculated to be a characteristic line La. When the actual viscosity of the engine oil OB that has not yet been heated is "Vb1" and the actual viscosity of the engine oil OB that has been heated is "Vb2", the viscosity change characteristic of the engine oil OB is calculated to be a characteristic line Lb. As described above, the viscosity change characteristic of the engine oil is presumed to vary depending on the type and deterioration state of the engine oil injected into the engine 12.

In other words, as illustrated in FIG. 8, even in the case of reducing each oil viscosity to the common target viscosity Vt, the engine oil OA is heated to a temperature Ta2, whereas the engine oil OB is heated to a temperature Tb2 that is higher than the temperature Ta2. Therefore, even in the case of reducing each oil viscosity to the common target viscosity Vt, the main heating energy Ex2 to be supplied to the electric heater 35 differs between a vehicle into which the engine oil OA is injected and a vehicle into which the engine oil OB is injected.

As illustrated in FIG. 9, in the vehicle into which the engine oil OA is injected, the electric heater 35 is caused to operate by the preheating energy E1, so that the temperature of the engine oil OA increases from "Ts" to "Ta1", and the actual viscosity decreases from "Va1" to "Va2". In other words, when the electric heater 35 is caused to operate by the preheating energy E1, the viscosity of the engine oil OA decreases by a change amount Da1. Thus, in order to reduce the oil viscosity from the actual viscosity Va2 to the target viscosity Vt, a main heating energy Ea2 is determined from the preheating energy E1, the inclination of the characteristic line La, and a change amount (difference) Da2, and the main heating energy Ea2 is supplied to the electric heater 35. In other words, in step S15, which has been described above, the main heating energy Ea2 (Ex2) to be supplied to the electric heater 35 is calculated based on the preheating energy E1, the inclination of the characteristic line La, and the change amount Da2 (Da2=Va2−Vt). The control system 60 calculates the main heating energy Ea2 such that the main heating energy Ea2 increases as the change amount Da2 increases.

As illustrated in FIG. 10, in the vehicle into which the engine oil OB is injected, the electric heater 35 is caused to operate by the preheating energy E1, so that the temperature of the engine oil OB increases from "Ts" to "Tb1", and the actual viscosity decreases from "Vb1" to "Vb2". In other words, when the electric heater 35 is caused to operate by the preheating energy E1, the viscosity of the engine oil OB decreases by a change amount Db1. Thus, in order to reduce the oil viscosity from the actual viscosity Vb2 to the target viscosity Vt, a main heating energy Eb2 is determined from the preheating energy E1, the inclination of the characteristic line Lb, and a change amount (difference) Db2, and the main heating energy Eb2 is supplied to the electric heater 35. In other words, in step S15, which has been described above, the main heating energy Eb2 (Ex2) to be supplied to the electric heater 35 is calculated based on the preheating energy E1, the inclination of the characteristic line Lb, and the change amount Db2 (Db2=Vb2−Vt). The control system 60 calculates the main heating energy Eb2 such that the main heating energy Eb2 increases as the change amount Db2 increases.

As illustrated in FIG. 5, after the control system 60 has calculated the main heating energy Ex2 in step S15, the control system 60 proceeds to step S16 and calculates a starting energy Est1 (kWh) when the oil viscosity is equal to the target viscosity Vt. The starting energy (first starting energy) Est1 is energy that is consumed by the starter generator 13 at the time of engine startup in a state where the oil viscosity is equal to the target viscosity Vt. After the control system 60 has calculated the starting energy Est1 in step S16, the control system 60 proceeds to step S17 and calculates a starting energy Est2 (kWh) when the oil viscosity is equal to the actual viscosity Vx2. The starting energy (second starting energy) Est2 is energy that is consumed by the starter generator 13 at the time of engine startup in a state where the oil viscosity is equal to the actual viscosity Vx2.

Figure 11:
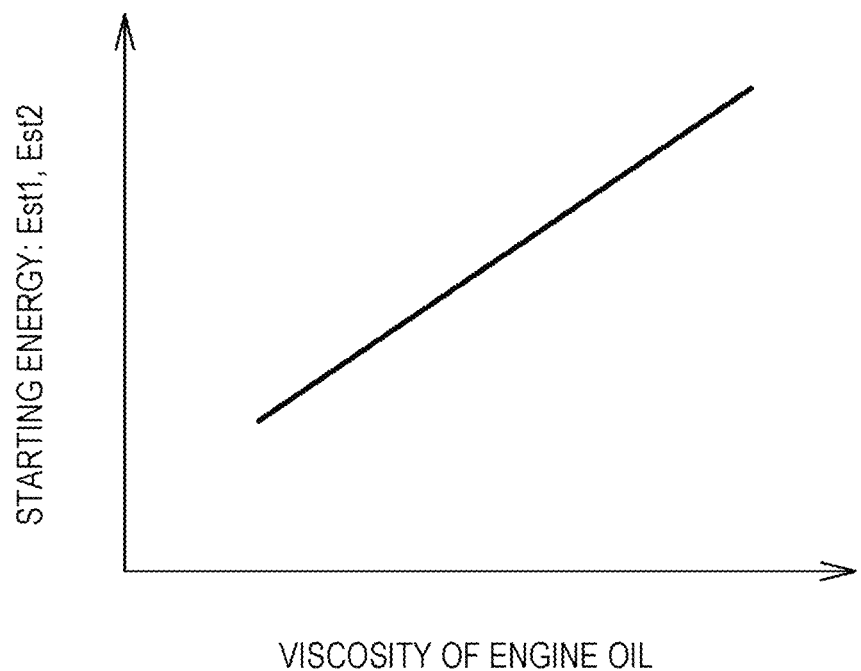
FIG. 11 is a graph illustrating an example of a relationship between oil viscosity and starting energy.

FIG. 11 is a graph illustrating an example of a relationship between oil viscosity and starting energy. As illustrated in FIG. 11, the starting energies Est1 and Est2 increase as the oil viscosity increases. In other words, in step S16, the control system 60 calculates the starting energy Est1 such that the starting energy Est1 increases as the target viscosity Vt increases. In addition, in step S17, the control system 60 calculates the starting energy Est2 such that the starting energy Est2 increases as the actual viscosity Vx2 increases. Note that the target viscosity Vt of the engine oil is a fixed value that is set beforehand by simulation or the like. However, the target viscosity Vt may be changed in accordance with aging deterioration of the starter generator 13 or the like.

As illustrated in FIG. 6, after the control system 60 has calculated the starting energy Est2 in step S17, the control system 60 proceeds to step S18 and determines whether the sum of the starting energy Est1 and the main heating energy Ex2 is lower than the starting energy Est2. In step S18, a situation in which the sum of the starting energy Est1 and the main heating energy Ex2 is lower than the starting energy Est2 is a situation in which the electric heater 35 is caused to operate before engine startup, resulting in lower energy consumption for the engine startup. On the other hand, in step S18, a situation in which the sum of the starting energy Est1 and the main heating energy Ex2 is higher than the starting energy Est2 is a situation in which the electric heater 35 is not caused to operate before the engine startup, resulting in lower energy consumption for the engine startup.

If the control system 60 determines in step S18 that the sum of the starting energy Est1 and the main heating energy Ex2 is lower than the starting energy Est2, the control system 60 proceeds to step S19 and determines whether the SOC of the battery pack 19 is lower than a threshold S1a. Here, as illustrated in FIG. 4, a threshold Sla is a threshold that is set to be slightly greater than the threshold S1. A situation in which the SOC is lower than the threshold S1a is a situation in which a transition to the combustion power generation mode will occur soon. Then, as illustrated in FIG. 6, if the control system 60 determines in step S19 that the SOC is lower than the threshold S1a, the control system 60 proceeds to step S20 and causes the electric heater 35 to operate by using the main heating energy Ex2 because the transition to the combustion power generation mode accompanied by the engine startup will occur soon.

After energization of the electric heater 35 has been completed in step S20, the control system 60 proceeds to step S21 and temporarily drives the electric oil pump 30 before the engine startup. Then, in step S21, the control system 60 calculates, based on the load torque of the electric oil pump 30, an actual viscosity Vx3 that is the actual oil viscosity. After the control system 60 has calculated the actual viscosity Vx3 in step S21, the control system 60 proceeds to step S22 and determines whether the actual viscosity Vx3 is equal to or lower than the target viscosity Vt. If the control system 60 determines in step S22 that the actual viscosity Vx3 is higher than the target viscosity Vt, the control system 60 proceeds to step S23 and causes the electric heater 35 to operate by adding predetermined energy to the electric heater 35 because heating of the engine oil is insufficient. In addition, after the control system 60 has caused the electric heater 35 to operate in step S23, the control system 60 proceeds to step S21 and calculates the actual viscosity Vx3 again. Then, the control system 60 proceeds to step S22 and determines whether the actual viscosity Vx3 is equal to or lower than the target viscosity Vt. In other words, the electric heater 35 continuously heats the engine oil until the actual viscosity Vx3 becomes equal to or lower than the target viscosity Vt.

If the control system 60 determines in step S22 that the actual viscosity Vx3 is equal to or lower than the target viscosity Vt, the control system 60 proceeds to step S24 because the heating of the engine oil is sufficient. In step S24, the control system 60 determines whether the SOC of the battery pack 19 is lower than the threshold S1. In step S24, a situation in which the SOC is lower than the threshold S1 is a situation in which the engine 12 is started so as to make a transition to the combustion power generation mode, that is, a situation in which the engine startup condition is satisfied. If the control system 60 determines in step S24 that the SOC is lower than the threshold S1, in order to make a transition from the power generation stop mode to the combustion power generation mode, the control system 60 proceeds to step S25 and drives the electric oil pump 30. Then, the control system 60 proceeds to step S26 and drives the starter generator 13.

As described above, in step S12 that corresponds to a first step, the control system 60 calculates the actual viscosity Vx1 of the engine oil based on the load torque of the electric oil pump 30. In steps S13 and S14 that correspond to a second step, the control system 60 causes the electric heater 35 to operate by the preheating energy E1 and then calculates the actual viscosity Vx2 of the engine oil based on the load torque of the electric oil pump 30. In step S15 that corresponds to a third step, the control system 60 calculates the main heating energy Ex2, which is to be supplied to the electric heater 35, based on the actual viscosity Vx2 of the engine oil and the target viscosity Vt of the engine oil. In addition, in steps S20 and S26 that correspond to a fourth step, the control system 60 causes the electric heater 35 to operate by the main heating energy Ex2 and then drives the starter generator 13 so as to start the engine 12. As a result, the oil viscosity can be appropriately reduced for the engine startup, and the startability of the engine 12 can be improved.

In steps S20, S25, and S26 that correspond to the fourth step, the control system 60 causes the electric heater 35 to operate by the main heating energy Ex2. Subsequently, the control system 60 drives the electric oil pump 30 and then drives the starter generator 13. In other words, after pumping the engine oil by driving the electric oil pump 30, the starter generator 13 is driven so as to cause the crankshaft 23 to perform starting rotation. This can reduce the rotational resistance of the crankshaft 23, and thus, the startability of the engine 12 can be further improved.

If the control system 60 determines in step S18 that the sum of the starting energy Est1 and the main heating energy Ex2 is equal to or higher than the starting energy Est2, the control system 60 proceeds to step S24 without causing the electric heater 35 to operate from the standpoint of increasing energy efficiency and determines whether the SOC is lower than the threshold S1. In other words, when the SOC falls below the threshold S1 and the engine startup condition is satisfied in a situation in which the sum of the starting energy Est1 and the main heating energy Ex2 is higher than the starting energy Est2, the control system 60 prohibits execution of step S20 corresponding to the fourth step. In this case, the control system 60 bypasses step S20 and proceeds to step S24, and thus, the control system 60 drives the starter generator 13 so as to start the engine 12 without causing the electric heater 35 to operate. In this manner, it can be appropriately determined whether to cause the electric heater 35 to operate from the standpoint of energy consumption, and the energy efficiency of the vehicle 11 can be increased.

<Oil Heating Control: Timing Chart>

Figure 12:
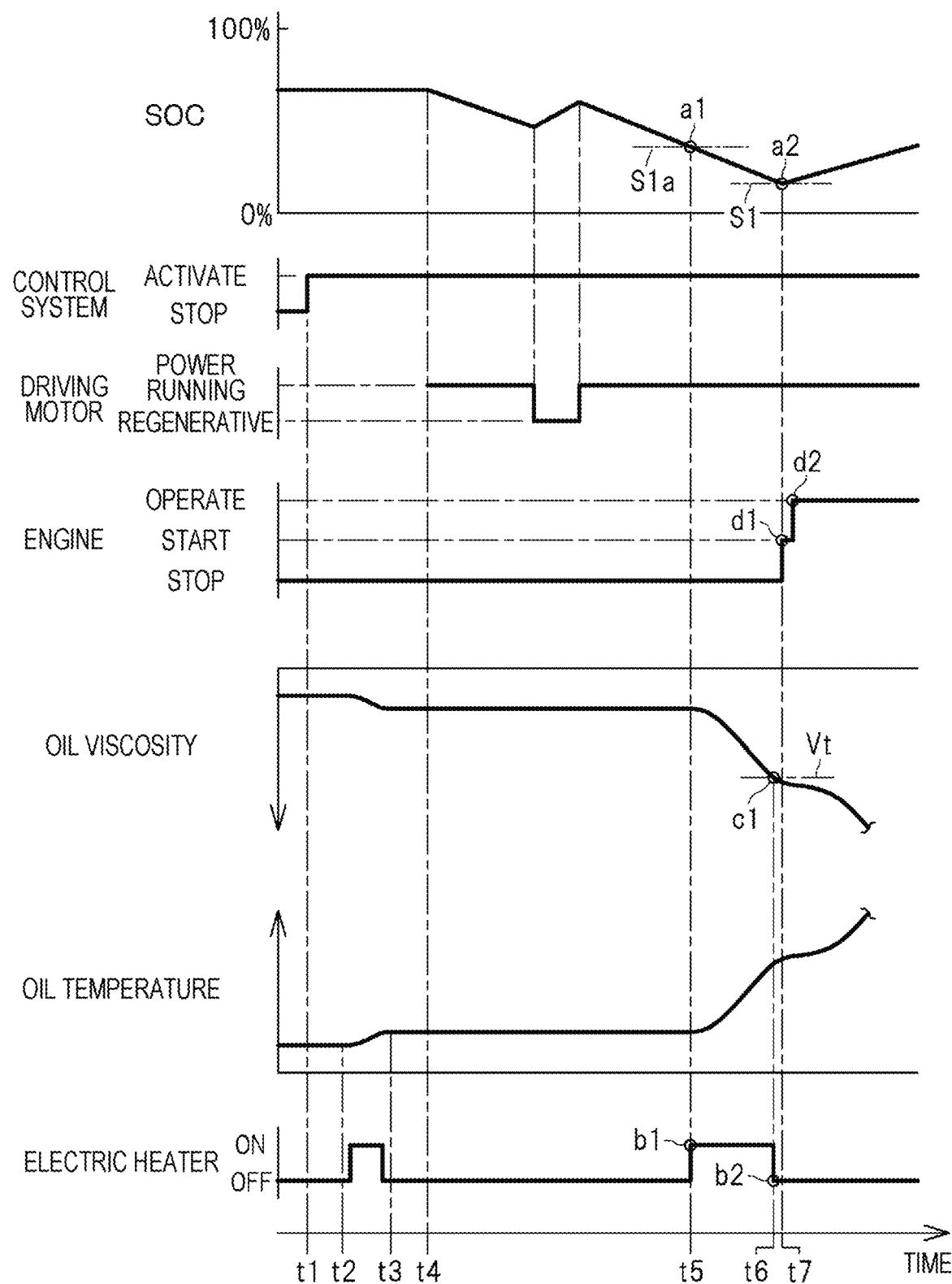
FIG. 12 is a timing chart illustrating an example of an execution state of the oil heating control.

The above-mentioned oil heating control will be described with reference to a timing chart. FIG. 12 is a timing chart illustrating an example of an execution state of the oil heating control. As illustrated in FIG. 12, when the control system 60 is activated at time t1, the actual viscosity Vx1 of the engine oil that has not yet been heated is calculated at time t2, and the actual viscosity Vx2 of the engine oil that has been heated is calculated at time t3. When the actual viscosities Vx1 and Vx2 of the engine oil are calculated in this manner, the main heating energy Ex2, which is to be supplied to the electric heater 35, is calculated as described above. In addition, when traveling in the power generation stop mode is started at time t4, the SOC of the battery pack 19 fluctuates in accordance with the power running state or the regenerative state of the driving motor 44.

As illustrated at time t5, when the SOC falls below the threshold S1a (reference sign a1), the electric heater 35 starts operating (reference sign b1). As illustrated at time t6, after the main heating energy Ex2 has been consumed by the electric heater 35 as a result of the electric heater 35 operating for a predetermined period of time, the electric heater 35 stops operating (reference sign b2). At time t6, since the heating of the engine oil is complete, the oil viscosity has been reduced to the target viscosity Vt (reference sign cl). After that, as illustrated at time t7, when the SOC falls below the threshold S1 and the engine startup condition is satisfied (reference sign a2), starting rotation is started by the starter generator 13 (reference sign d1), and the engine 12 is controlled to be in the operating state (reference sign d2).

Second Embodiment

In the case illustrated in FIG. 2, although the electric heater 35 is provided at the oil pan 34 of the engine 12, the electric heater 35 is not limited to being provided at the oil pan 34 and may be provided at a different position in the engine 12. FIG. 13 is a diagram illustrating a vehicle driving device 80 according to another embodiment.

As illustrated in FIG. 13, the vehicle driving device 80 includes a power generation unit 82 that includes an engine 81 and the starter generator 13. The engine 81 of the power generation unit 82 is an engine that includes a so-called dry sump hydraulic system. The engine 81 includes an oil tank 83, a scavenging pump 84, and the electric oil pump 30. The oil tank 83 stores the engine oil X. The scavenging pump 84 is located upstream of the oil tank 83. The electric oil pump 30 is located downstream of the oil tank 83. The engine 81 further includes the electric heater 35 provided at the oil tank 83.

By driving the scavenging pump 84, the engine oil is supplied from the oil pan 34 to the oil tank 83. By driving the electric oil pump 30, the engine oil X in the oil tank 83 is supplied to each sliding member including a bearing through the oil passage of the cylinder block 21. The engine oil supplied to each of the sliding members in the engine 81 lubricates each of the sliding members and then is returned to the oil pan 34, which is located below the cylinder block. In addition, the engine control unit 36, which is an electronic control unit, is coupled to the electric oil pump 30, the electric heater 35, the scavenging pump 84, the injector 27, and the ignition device 28.

In this manner, the vehicle driving device 80 including the dry sump engine 81 can also serve in a manner similar to the vehicle driving device 10, which has been described above. In other words, in step S12 corresponding to the first step, the control system 60 calculates the actual viscosity Vx1 of the engine oil based on the load torque of the electric oil pump 30. In steps S13 and S14 corresponding to the second step, the control system 60 causes the electric heater 35 to operate by the preheating energy E1 and then calculates the actual viscosity Vx2 of the engine oil based on the load torque of the electric oil pump 30. In step S15 corresponding to the third step, the control system 60 calculates the main heating energy Ex2, which is to be supplied to the electric heater 35, based on the actual viscosity Vx2 of the engine oil and the target viscosity Vt of the engine oil. In steps S20 and S26 corresponding to the fourth step, the control system 60 causes the electric heater 35 to operate by the main heating energy Ex2 and then drives the starter generator 13 so as to start the engine 81. As a result, the oil viscosity can be appropriately reduced for the engine startup, and the startability of the engine 81 can be improved.

It is obvious that the present invention is not limited to the above-described embodiments, and various changes can be made within the gist of the present invention. In the above description, although the control system 60 includes the multiple control units 36, 50, 52, and 61, the control system 60 is not limited to this. For example, the control system 60 may be constituted by a single control unit. In addition, as the electric heater 35, an electric heater that generates heat by using an electrically heated wire may be used, or a positive temperature coefficient (PTC) heater may be used. In addition, although a power source of the electric heater 35 and a power source of the electric oil pump 30 are each a low-voltage battery, each of the power sources is not limited to this, and electric power may be supplied to the electric heater 35 and the electric oil pump 30 from the high-voltage battery pack 19.

In the case illustrated in FIG. 8, FIG. 9, and FIG. 10, although the characteristic lines La and Lb are straight lines, the characteristic lines La and L are not limited to being straight lines and may be curved lines. In the above description, the characteristic lines La and Lb indicating the viscosity change characteristics are calculated based on the two actual viscosities Vx1 and Vx2. However, the characteristic lines La and Lb are not limited to being calculated based on the two actual viscosities Vx1 and Vx2 and may be calculated based on three or more actual viscosities. In addition, before the actual viscosity Vx2 of the engine oil is calculated, the preheating energy E1 that is to be supplied to the electric heater 35 may be a preset fixed value or may be a value that varies depending on the outside air temperature, an oil temperature, or the like. In the case illustrated in FIG. 7, the characteristic line indicating the relationship between the load torque and the actual viscosities Vx1 and Vx2 is a straight line. However, the characteristic line indicating the relationship between the load torque and the actual viscosities Vx1 and Vx2 is not limited to being a straight line and may be a curved line. In addition, in the case illustrated in FIG. 11, the characteristic line indicating the relationship between the oil viscosity and the starting energies Est1 and Est2 is a straight line. However, the characteristic line indicating the relationship between the oil viscosity and the starting energies Est1 and Est2 is not limited to being a straight line and may be a curved line.

In the flowchart illustrated in FIG. 5 and FIG. 6, when it is determined in step S11 that the outside air temperature is equal to or higher than the threshold A1, the electric heater 35 is not caused to operate because the oil viscosity has already been low, and thus, the process bypasses step S20 and proceeds to step S24. In this manner, the control system 60 determines whether the oil viscosity is low based on the outside air temperature. However, the present disclosure is not limited to this, and for example, the control system 60 may determine whether the oil viscosity has already been low based on the temperature of the engine oil.

In the flowchart illustrated in FIG. 5 and FIG. 6, it is determined, based on the starting energy Est1 and Est2, whether to cause the electric heater 35 to operate. However, the present disclosure is not limited to this. For example, in a situation in which the outside air temperature or the oil temperature is lower than a predetermined value, the electric heater 35 may be caused to operate before the engine startup without determining the starting energies Est1 and Est2. In addition, in the flowchart illustrated in FIG. 5 and FIG. 6, the actual viscosity Vx3 of the engine oil is determined again after the electric heater 35 has been caused to operate by the main heating energy Ex2. In other words, after the electric heater 35 has been caused to operate by the main heating energy Ex2, if the engine startup condition is satisfied without determining the actual viscosity Vx3 of the engine oil again, the engine may be started by driving the starter generator 13.

In the above description, although the starter generator 13, which serves as an electric motor and a power generator, is used as the starter motor, the starter motor is not limited to the starter generator 13. For example, an electric motor including a pinion that meshes with a ring gear of a flywheel may be used as the starter motor, or a motor generator that is directly coupled to the crankshaft 23 may be used as the starter motor. Alternatively, a motor generator that is coupled to the crankshaft 23 via a damper mechanism, a clutch mechanism, a planetary gear mechanism, or the like may be used as the starter motor.

The invention claimed is:

1. A vehicle driving device including an engine, the vehicle driving device comprising:
    an electric pump provided in the engine and configured to pump an engine oil;
    an electric heater provided in the engine and configured to heat the engine oil;
    a starter motor provided in the engine and configured to cause an output shaft to perform starting rotation; and
    a control system comprising a processor and a memory communicably coupled to each other, the control system being configured to control the electric pump, the electric heater, and the starter motor,
    wherein the control system is configured to execute
        a first step of driving the electric pump before startup of the engine and calculating a first actual viscosity of the engine oil based on a load torque of the electric pump,
        a second step of causing the electric heater to operate by supplying a first energy to the electric heater, driving the electric pump after the electric heater has been caused to operate and before the startup of the engine, and calculating a second actual viscosity of the engine oil based on the load torque of the electric pump,
        a third step of calculating, based on the second actual viscosity of the engine oil and a target viscosity of the engine oil, a second energy to be supplied to the electric heater, and
        a fourth step of causing the electric heater to operate by supplying the second energy to the electric heater and then driving the starter motor to cause the output shaft to perform starting rotation.

2. The vehicle driving device according to claim 1, wherein, in the fourth step, the control system is configured to
    cause the electric heater to operate by supplying the second energy to the electric heater, then drive the electric pump, and then drive the starter motor to cause the output shaft to perform starting rotation.

3. The vehicle driving device according to claim 1, wherein, in the first step, the control system is configured to
    calculate the first actual viscosity such that the first actual viscosity increases as the load torque of the electric pump increases.

4. The vehicle driving device according to claim 1, wherein, in the second step, the control system is configured to
    calculate the second actual viscosity such that the second actual viscosity increases as the load torque of the electric pump increases.

5. The vehicle driving device according to claim 1, wherein, in the third step, the control system is configured to
    calculate the second energy such that the second energy increases as a difference between the second actual viscosity and the target viscosity increases.

6. The vehicle driving device according to claim 1, wherein, in the third step, the control system is configured to
    calculate a viscosity change characteristic of the engine oil based on the first actual viscosity, the second actual viscosity, and the first energy, and
    calculate the second energy based on the viscosity change characteristic, the second actual viscosity, and the target viscosity.

7. The vehicle driving device according to claim 1, wherein the control system is configured to
    calculate a first starting energy consumed by the starter motor when a viscosity of the engine oil is equal to the target viscosity,
    calculate a second starting energy consumed by the starter motor when a viscosity of the engine oil is equal to the second actual viscosity, and
    execute the fourth step when an engine startup condition is satisfied in a situation in which a sum of the first starting energy and the second energy is lower than the second starting energy.

8. The vehicle driving device according to claim 7, wherein the control system is configured to, when an engine startup condition is satisfied in a situation in which a sum of the first starting energy and the second energy is higher than the second starting energy,
    prohibit execution of the fourth step and drives, without causing the electric heater to operate, the starter motor to cause the output shaft to perform starting rotation.

9. The vehicle driving device according to claim 7, wherein the control system is configured to calculate the first starting energy such that the first starting energy increases as the target viscosity increases, and
    wherein the control system is configured to calculate the second starting energy such that the second starting energy increases as the second actual viscosity increases.

10. The vehicle driving device according to claim 1, further comprising:
    a driving motor configured to be coupled to at least one wheel.

* * * * *